Aug. 11, 1931.  W. J. MICHALKA  1,817,999
STALK CUTTER
Filed Jan. 2, 1931  2 Sheets-Sheet 1

Inventor
W. J. Michalka
By C. A. Snow & Co.
Attorneys.

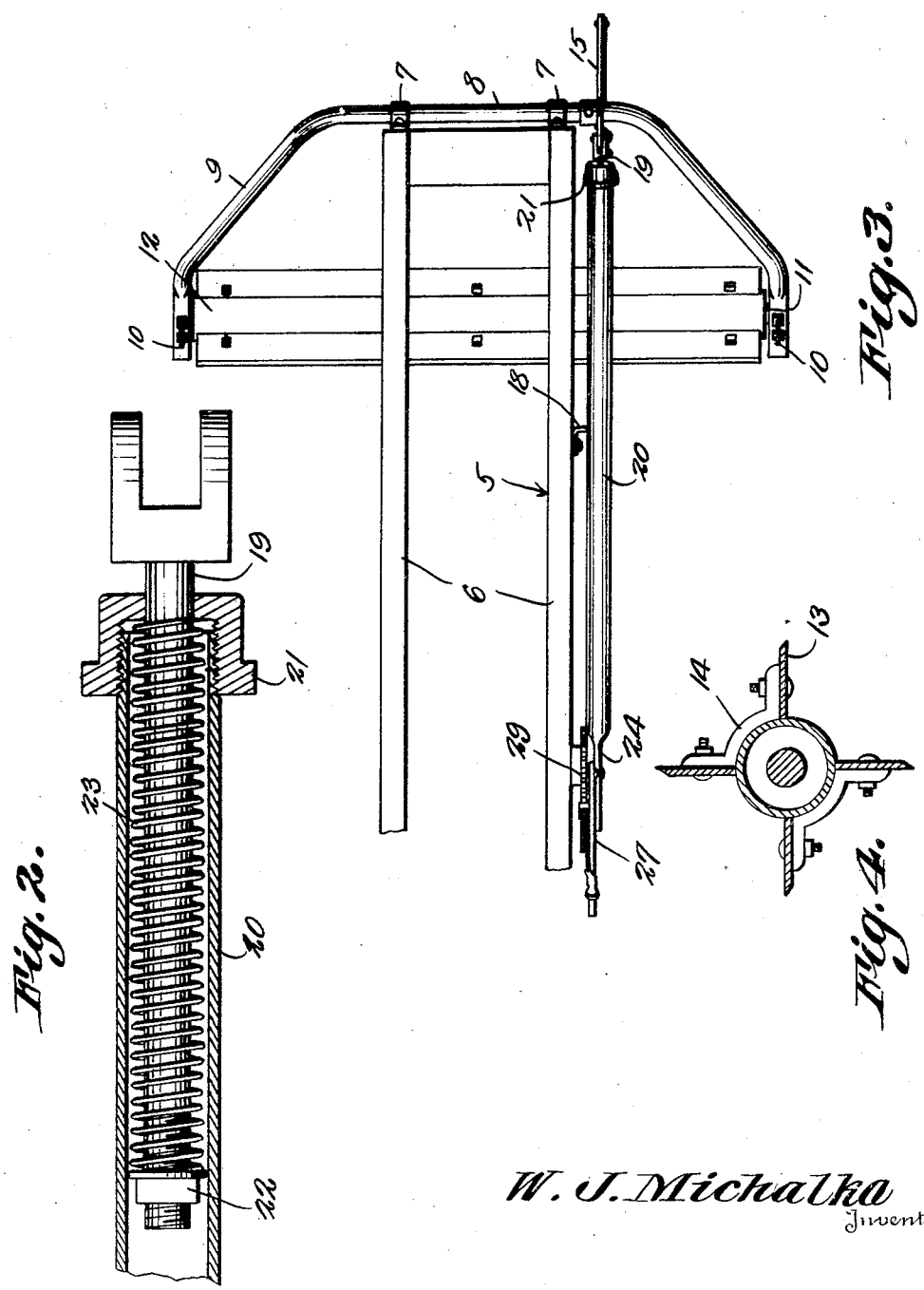

Patented Aug. 11, 1931

1,817,999

UNITED STATES PATENT OFFICE

WILLIAM J. MICHALKA, OF CAMERON, TEXAS

STALK CUTTER

Application filed January 2, 1931. Serial No. 506,223.

This invention relates to agricultural machines, and more particularly to an attachment designed for use in connection with tractors, the primary object of the invention being to provide means for cutting or chopping the stalks in a field during the plowing operation.

An important object of the invention is to provide a device of this character which may be readily and easily controlled by the operator of the tractor, means being provided for raising and lowering the cutter, so that the cutter may be readily and easily thrown into and out of operation.

A further object of the invention is to provide means for exerting pressure on the cutter to increase the efficiency of the cutter.

A still further object of the invention is to provide means to permit of vertical movement of the cutter, should the cutter pass over stones, stumps, or other obstructions in the field.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a fragmental sectional view through the tubular connecting member, forming a part of the operating mechanism.

Figure 3 is a fragmental plan view of the attachment.

Figure 4 is a sectional view taken on line 4—4 of Figure 3.

Figure 1:
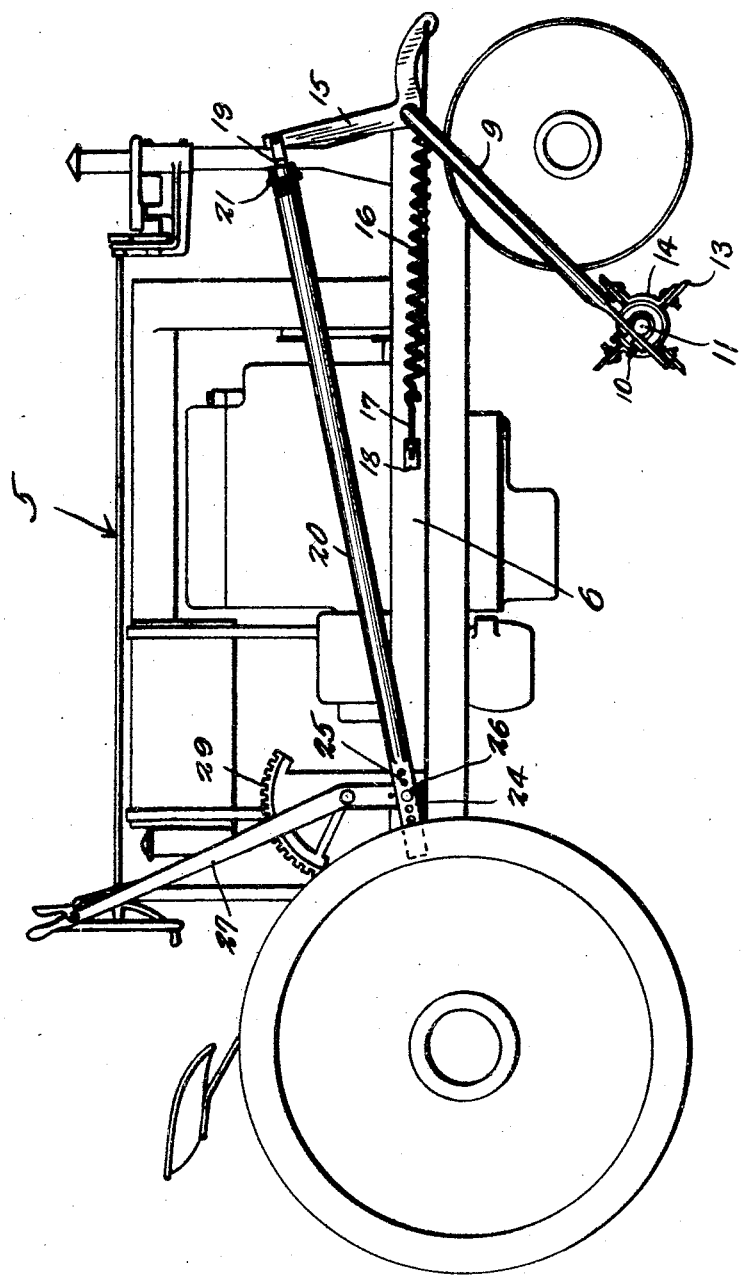
Figure 1 is a side elevational view illustrating an attachment constructed in accordance with the invention, as mounted on a tractor.

Referring to the drawings in detail, the reference character 5 designates a tractor, the frame of which comprises the usual side bars 6 that are spaced apart in the usual and well known manner.

At the forward ends of the side bars 6, are straps 7 that provide bearings for the supporting rod 8 that is shown as having rearwardly extended end portions 9, the extremities thereof being flattened and formed with openings to receive the U bolts 10. These U bolts 10 provide bearings for the shafts 11 that extend from the ends of the cylinder 12, to which the blades 13 are secured, as by means of the clamps 14.

Secured to the supporting rod 8 is a bell crank lever 15 that has one of its arms curved downwardly, where it is supplied with a pin to receive one end of the spring 16, the opposite end of the spring being connected with the bolt 17 that passes through the bracket 18 secured to the side bar of the chassis. Thus it will be seen that due to this construction, a pull is directed to the downwardly curved arm of the bell crank lever, to normally urge the opposite arm thereof forwardly.

Pivotally connected with the bell crank lever, is a rod 19 that extends into the tubular bar 20 that has one end thereof closed by means of the threaded cap 21. At the inner end of the rod 19 is a nut 22 that bears against one end of the spring 23, the opposite end of the spring resting against the cap 21, as clearly shown by Figure 2 of the drawings. One end of the tubular bar 20 is flattened as at 24, where it is provided with a plurality of openings 25 that receive the bolt 26 which extends from the lever 27. The lever 27 is pivotally mounted on the frame of the tractor, and is provided with the usual sliding bolt that engages within the rack 29, to hold the lever in its positions of adjustment.

When it is desired to move the cutter into operation, the lever 27 is pushed forwardly, which action will throw the blades into engagement with the ground surface. The pressure on the blades may of course be regulated by the position of the lever 27, the adjustment being necessary, according to the condition of the ground over which the cutter is being moved. Should the blades engage a rock, stump or other obstruction in the field, the connection between the supporting rod 8, and tubular bar 20, will permit of movement of the rod 19, bell crank lever 15 and supporting rod 8, against the tension of the spring 23, which spring will act to return the cutter to its initial position.

Should it be desired to throw the cutter out of operation, the lever 27 is pulled towards the operator, causing a reverse movement of the bell crank lever, resulting in the rotary cutter being elevated to a position directly under the tractor, and near the side bars of the tractor frame.

It will of course be understood that it is contemplated to employ a cutter of this character on the forward end of a tractor during the plowing operation, so that all stalks, weeds or other vegetation may be cut by the device prior to the turning under of the soil by the plow.

I claim:

In a device of the class described, a supporting rod, means for pivotally mounting the supporting rod at the forward end of a tractor, said rod having right angled end portions, a cylinder pivotally mounted at the free ends of the right angled end portions, blades carried by the cylinder, a bell crank lever secured to the rod, one arm of the bell crank lever being curved, a coiled spring connected with the curved arm of the bell crank lever and adapted to normally urge the rod in one direction, an operating lever, a tubular bar connected with the lever, a rod extending into one end of the tubular bar, a coiled spring surrounding the rod, a cap on one end of the tubular bar and acting as a stop for one end of the coiled spring, means on one end of the rod for engaging the opposite end of the spring, said spring adapted to restrict movement of the rod within the tubular bearing, and means for securing the lever against movement.

In testimony that I claim the foregoing as my own, I have hereto affixed my signature.

WILLIAM J. MICHALKA.